United States Patent [19]

Tsai et al.

[11] Patent Number: 4,866,151
[45] Date of Patent: Sep. 12, 1989

[54] POLYSACCHARIDE GRAFT POLYMERS CONTAINING ACETAL GROUPS AND THEIR CONVERSION TO ALDEHYDE GROUPS

[75] Inventors: John J. Tsai, Belle Mead; Patrick G. Jobe, Westfield; Robert L. Billmers, Stockton, all of N.J.

[73] Assignee: National Starch and Chemical Corporation, Bridgewater, N.J.

[21] Appl. No.: 112,644

[22] Filed: Oct. 26, 1987

Related U.S. Application Data

[63] Continuation-in-part of Ser. No. 30,404, Mar. 25, 1987, abandoned.

[51] Int. Cl.$^4$ .................. C08B 31/08; C08B 37/14; D21H 3/20
[52] U.S. Cl. .................. 527/300; 527/305; 527/306; 527/313; 162/164.1; 162/164.6
[58] Field of Search .................. 527/300, 304, 305, 306, 527/313; 536/30, 43, 45, 52, 56, 84, 104, 111, 114; 162/158, 164.1, 164.6

[56] References Cited

U.S. PATENT DOCUMENTS

| | | | |
|---|---|---|---|
| 2,803,558 | 8/1957 | Fronmuller | 106/205 |
| 3,062,652 | 11/1962 | Jeffreys et al. | 96/99 |
| 3,086,969 | 4/1963 | Slager | 536/105 |
| 3,519,618 | 7/1970 | Parmerter | 536/104 |
| 3,553,193 | 1/1971 | LeRoy et al. | 536/105 |
| 3,632,802 | 1/1972 | BeMiller et al. | 536/104 |
| 3,740,391 | 6/1973 | Williams et al. | 536/104 |
| 4,508,594 | 4/1985 | Jansma et al. | 162/135 |
| 4,663,448 | 5/1987 | Chiu | 536/111 |
| 4,675,394 | 6/1987 | Solarek et al. | 536/43 |
| 4,703,116 | 10/1987 | Solarek et al. | 536/104 |
| 4,731,162 | 3/1988 | Solarek et al. | 536/43 |
| 4,741,804 | 5/1988 | Solarek et al. | 162/175 |

FOREIGN PATENT DOCUMENTS 0146380  3/1985  European Pat. Off. .

Primary Examiner—John Kight
Assistant Examiner—Nathan M. Nutter
Attorney, Agent, or Firm—Margaret B. Kelley; Edwin M. Szala

[57] ABSTRACT

Polysaccharide graft polymers which comprise an acetal-containing or aldehyde-containing homopolymer or copolymer grafted to a polysaccharide base have been prepared. The monomer repeating units in the homopolymer are derived from one or more ethylenically or allylically unsaturated monomers containing an acetal group or aldehyde group; The monomer repeating units in the copolymer are derived from the above monomer and derived from one or more ethylenically or allylically unsaturated monomers other than the acetal-containing or aldehyde-containing monomer. A and A' are independently a lower alkyl or A and A' together form at least a 5-membered cyclic acetal; with the proviso that the graft polymer contain no

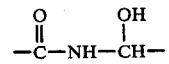

groups when the aldehyde groups are present. The aldehyde-containing graft polymers are useful for imparting wet strength to paper. Various novel acetal- and aldehyde-containing monomers have also been prepared; they can be graft polymerized to polysaccharide substrates or polymerized by conventional emulsion polymerization techniques with vinyl polymerizable monomers.

15 Claims, No Drawings

POLYSACCHARIDE GRAFT POLYMERS CONTAINING ACETAL GROUPS AND THEIR CONVERSION TO ALDEHYDE GROUPS

This application is a continuation-in-part of Ser. No. 030,404 filed Mar. 25, 1987 and now abandoned.

BACKGROUND OF THE INVENTION

This invention relates to novel polysaccharide graft polymers containing acetal groups and to the methods for their preparation. It also relates to novel polysaccharide graft polymers containing aldehyde groups and to their preparation from the corresponding acetals. It also relates to the use of the aldehyde-containing graft polymers as wet strength agents in paper. It further relates to novel acetal-containing monomers suitable for use in the polysaccharide graft polymerization.

As used herein, the term "paper" includes sheet-like masses and molded products made from fibrous materials which may be derived from natural cellulosic sources as well as from synthetics such as polyamides, polyesters, and polyacrylic resins, and from material fibers such as asbestos and glass. In addition, papers, made from combinations of cellulosic and synthetic materials are applicable herein. Paperboard is also included within the term "paper".

Oxidative and non-oxidative methods have been used to introduce aldehyde groups into polysaccharides such as starches, gums, and celluloses. The oxidative methods used have included treatment with periodic acid, periodates, or alkali metal ferrates. See U.S. Pat. No. 3,086,969 (issued Apr. 23, 1963 to J. E. Slager); U.S. Pat. No. 3,062,652 (issued Nov. 6, 1962 to R. A. Jeffreys et al.); and U.S. Pat. No. 3,632,802 (issued Jan. 4, 1972 to J. N. BeMiller et al.) The disadvantages of the oxidative method include degradation to lower molecular weight products and the formation of carboxyl groups due to further oxidation of the aldehyde groups. U.S. Pat. No. 3,553,193 (issue Jan. 5, 1973 to D. H. LeRoy et al.) describes an improved method for oxidizing starch using an alkali metal bromite or hypobromite under carefully controlled conditions, which reportedly results in a substantially greater proportion of carbonyl groups (i.e., aldehyde groups) than carboxyl groups.

The non-oxidative methods typically involve the reaction of the polysaccharide with an aldehyde-containing reagent. See U.S. Pat. Nos. 3,519,618, (issued July 7, 1970 to S. M. Parmerter); U.S. Pat. No. 3,740,391 (issued June 19, 1973 to L. L. Williams et al.); and U.S. Pat. No. 2,803,558 (issued Aug. 20, 1957 to G. D. Fronmuller). Another nonoxidative method involves the acid conversion of acetal-containing polysaccharide derivatives to aldehyde-containing polysaccharide derivatives. See U.S. Pat. No. 4,675,394, filed July 24, 1985 and U.S. Pat. No. 4,703,116 and Feb. 14, 1986.

Polyacrylamide-grafted starch polymers containing aldehyde groups are disclosed in European patent appln. No. 147,380 (published July 3, 1985 with the inventors being D. N. VanEenam). Unlike the glyoxalated starch acrylamides of Williams (U.S. Pat. No. 3,740,391 cited above) the polymers contains polyacrylamide grafted to the starch, but like the Williams product the aldehyde groups are introduced by glyoxalating the resulting product (or treating the product with other reactants containing two or more aldehyde units).

One of the disadvantages of introducing the aldehyde groups directly using an aldehyde-containing reagent, such as glyoxal, is the possibility of the derivative crosslinking prior to use. This is a particular disadvantage when the products are being used to impart temporary wet strength to paper via a crosslinking reaction with the cellulose fibers.

Therefore, there is a need for aldehyde-containing polysaccharide derivatives wherein the method for introducing the aldehyde groups is not dependent on a reaction with an aldehyde-containing reagent or direct oxidation to an aldehyde group.

SUMMARY OF THE INVENTION

The present invention provides a polysaccharide graft polymer which comprises an acetal-containing homopolymer or copolymer grafted to a polysaccharide base. The monomer repeating unit in the homopolymer is derived from one or more ethylenically or allylically unsaturated monomers containing an acetal group

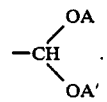

The monomer repeating units in the copolymer are derived from one or more ethylenically or allylically unsaturated monomers containing an acetal group

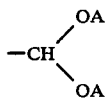

and from one or more ethylenically or allylically unsaturated monomers other than an acetal-containing monomer A and A' are independently a lower alkyl or A and A' together form at least a 5-membered cyclic acetal.

The present invention also provides a polysaccharide graft polymer which comprises an aldehyde-containing homopolymer or copolymer grafted to a polysaccharide base. In the homopolymer the monomer repeating unit is derived from one or more ethylenically or allylically unsaturated monomers containing an aldehyde group (—CHO). In the copolymer the repeating units are derived from one or more ethylenically or allylically unsaturated monomers containing an aldehyde group (—CHO) and one or more ethylenically or allylically unsaturated monomers other than an aldehyde containing monomer, with the proviso that the graft polymer contain no

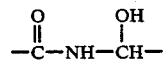

groups.

The practioner will recognize that in the above structures the monomer units may be randomly arranged or arranged alternately or in blocks and that values for x, y, and z will vary depending upon the polymerization conditions and monomer reactivity.

Typical monomers have the structure

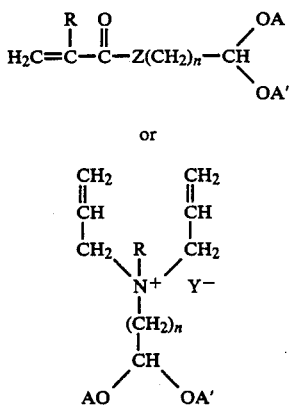

or wherein Z is O or NR; R is H or a lower alkyl, preferably —CH$_3$; A and A' are as defined above; n is at least 1, typically 1-6; and Y$^-$ is counterion such as a halide. The polysaccharide molecule may be modified by the introduction of cationic, anionic, nonionic, amphoteric, and/or and zwitterionic substituent groups. The molecule may also be modified by the introduction of substituents containing acetal groups which can subsequently converted to an aldehyde as disclosed in U.S. Ser. Nos. 758,634, and 829,675 filed July 24, 1985 and Feb. 14, 1986. As used herein, the terms "cationic" and anionic" are intended to cover cationogenic and anionogenic groups.

Novel monomers containing aromatic acetals, which have the structure

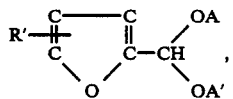

where R' is an ethylenically unsaturated group capable of grafting to a polysaccharide substrate and A and A' are as defined above, are also useful herein. Typical of these monomers are [5-(dimethoxymethyl)furfur-2-yl]methyl acrylate and methacrylate which have the structures

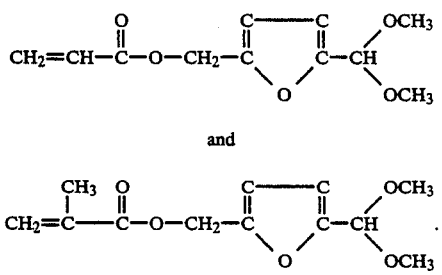

A variety of methods can be used to prepare the above monomers containing the aromatic acetal groups. The first method involves the reaction of an alcohol-containing aromatic aldehyde or acetal (e.g., 5-hydroxymethyl-2-furfuraldehyde) with a polymerizable acid chloride (e.g., acryoyl chloride). The hydrogen chloride evolved in the reaction can be scavenged by a non-nucleophilic base (e.g., 2,4,6-collidine). This reaction can also be run in a two phase system in which the aqueous phase contains sodium hydroxide and the organic phase is a non-water miscible solvent (e.g., toluene). The resulting esters are isolated and purified by distillation. The second method involves the reaction of an aromatic chloromethyl aldehyde (e.g., 5-chloromethyl furfuraldehyde) with a polymerizable amine (e.g., vinyl amine) or polymerizable alcohol (e.g., allyl alcohol). The reaction is carried out in a non-reactive solvent (e.g., toluene, tetrahydrofuran, and the like). The reaction mixture is generally refluxed overnight. Acid scavengers may be used, but are not necessary. The products may be purified by distillation before use.

The method for preparing graft copolymers of polysaccharides such as starches, cellulose, and gums are well known in the literature. See, for example, Block and Graft Copolymerization, Vol. 1, R. J. Ceresa, ed., John Wiley and Sons (1973). Such methods, as represented by the teachings of U.S. Pat. Nos. 3,809,644, 3,976,552, and 4,131,576, include polymerizations in water, in water-solvent mixtures, and in the dry state and may be initiated by mechanical, chemical, and irradiative techniques.

The preferred method of preparing the acetal-containing polysaccharide graft polymers involves free radical polymerization of the acetal-containing monomer with the polysaccharide. Modification of starch by graft polymerization is described at pages 22–47 to 22–54 in Chapter 22: Starch and Its Modifications in the Handbook of Water-Soluble Gums and Resins, edited by Robert L. Davidson, McGraw-Hill Book Co., New York 1980. Free radical initiating methods include physical (e.g., irradiation) and chemical methods (e.g., the use of catalysts). Suitable catalysts include those of the type that establish mild oxidizing conditions in the reaction mixture in the concentrations used and are usually classified as free radical formers or sometimes called peroxidic catalysts. This class of catalysts include, among others, hydrogen peroxides, aqueous soluble organic peroxides, hydroperoxides, persulfate salts such as potassium and ammonium persulfate, ceric ions, and redox catalysts. Other free radical catalysts are those classified as water soluble "azo" catalysts such as 2,2'-azo-bis(amidinopropane) hydrochloride. The reaction is typically carried out until all of the monomer is consumed. Typically, the starch grafts are prepared by suspending the starch in an aqueous solution, heating the suspension until the starch is gelatinized, adding the monomer, and then adding the free radical catalyst. Granular starches can also be used. They may be first heated in water at 50° C. for one hour to swell before cooling to room temperature for the subsequent polymerization reaction.

The aldehyde-containing polysaccharide graft polymers are prepared by hydrolyzing the corresponding acetal groups of the corresponding acetal-containing polysaccharides graft polymer at a pH of less than 7, preferably 5 or less, most preferably 2–4. Direct grafting of the aldehyde-containing monomer to the polysaccharide substrate is not recommended.

The aldehyde and acetal derivatives are useful in conventional applications where water-soluble or water-swellable polysaccharide derivatives are useful, for example, as coatings, adhesives and paper additives. The cationic aldehyde-containing derivatives are particularly useful as paper additives. They are useful as temporary wet strength additives, for example in tissue/toweling paper stocks, and as wet and dry strength additives for all paper types including liner board. Typical cationic and cationogenic groups include the diethylaminoethyl ether groups introduced by reaction with 2-diethylaminoethylchloride hydrochloride or 3-(trimethylammonium chloride)-2-hydroxypropyl ether groups introduced by reaction with 3-chloroto-2-hydroxypropyl trimethylammonium chloride. The aromatic aldehyde and acetal derivatives are particularly useful when used in combination with crosslinking agents such as polyamines.

DESCRIPTION OF THE PREFERRED EMBODIMENTS

The polysaccharide graft polymers may be prepared using only the acetal-containing monomers. However, in some applications where the presence of fewer aldehyde groups (formed by hydrolyzing the acetal) is desirable, other typical comonomers can be used. These can include ethylenically unsaturated monomers which may contain anionic or cationic charges. Suitable monomers include styrene and substituted styrenes such as vinyl toluene, -methyl styrene and chlorostyrene; compounds having the acrylic group as the polymerizable nucleus, such as acrylic and methacrylic acids, and salts or esters thereof (including the methyl, ethyl, and butyl. esters); acrylonitrile; vinyl chloride; vinyl acetate and other vinyl esters; vinyl pyridine and vinyl pyrrolidone; vinyl ketones; vinylidene compounds, such as vinylidene chloride; allylidene compounds such as allylidene diacetates; conjugated diene monomers such as butadiene-1,3, isoprene, chlorobutadiene-1,3; diallylamine and its respective salts, N-alkyl diallylamine and its respective salts, diallyl dialkyl ammonium quaternary salts, N,N-dialkylaminoalkyl acrylate and methacrylate and their respective salts, N,N-dialkylaminoalkyl acrylamide and methacrylamide and the respective salts and vinylbenzyldialkyl amine and their respective salts, and such acids as vinylsulfonic acid, styrene sulfonic acid, (meth-)acrylamidopropanesulfonic acid and their respective salts.

When the polysaccharide is starch, applicable starch bases which may be used herein may be derived from any plant source including corn, potato, sweet potato, wheat, rice, sago, tapioca, waxy maize, sorghuym, high amylose corn, or the like. Starch flours may also be used as a starch source. Also included are the conversion products derived from any of the former bases including, for example, dextrins prepared by the hydrolytic action of acid and/or heat; oxidized starches prepared by treatment with oxidants such as sodium hypochlorite; fluidity or thin-boiling starches prepared by enzyme conversion or mild acid hydrolysis; and derivatized and crosslinked starches. The starch base may be a granular starch or a gelatinized starch, i.e. non-granular starch.

When the polysaccharide is gum, applicable bases which may be used herein are polygalactomannans, such as guar or locust bean gum, which are heteropolysaccharides composed principally of long chains of 1→4-β D-mannopyranosyl units to which single unit side chains of α-D-galactopyranosyl units are joined by 1→6 linkages and hereafter referred to as "gums". Also suitable is gum arabic. Also included are degraded gum products resulting from the hydrolytic action of acid, heat, shear, and/or enzyme; oxidized gums; and derivatized gums.

When the polysaccharide is cellulose, applicable bases useful herein include cellulose and cellulose derivatives, especially water-soluble cellulose ethers such as alkyl and hydroxyalkylcelluloses, specifically methylcellulose, hydroxyethylmethylcellulose, and ethylhydroxyethylcellulose.

Several polymerization procedures may be used. In one method a water-soluble monomer is graft polymerized with a granular starch, gelatinized starch or any gum, cellulose, or cellulose derivative. The procedure described in Block and Graft Copolymerization by R. J. Ceresa (cited previously) is suitable. In a second and preferred method, the grafting is carried out in a two-phase system as described in U.S. Pat. No. 4,131,576 issued Dec. 26, 1978 to C. P. Iovine et al.

After completion of the graft reaction the solid acetals may be separated, if desired, from the reaction mixture by centrifugation or filtration. Preferably, the derivative is purified by washing with water in the case of the starch derivatives, with the aqueous solution of water-miscible solvent in the case of the gum derivatives or with the solvent in the case of the cellulose derivatives. Further washing with the same solvent may be desirable for the gum derivatives. The derivatives are then dried using conventional methods, as in a vacuum, drum, flash, belt, or spray drier.

The conversion of the polysaccharide acetals to the aldehydes is carried out under acidic conditions, typically at a pH of 7 or less, preferably 5 or less, most preferably at about 2-3. It may be carried directly without isolation of the acetal or the acetal may be isolated as above, resuspended in water prior to conversion. If desired, the aldehyde derivatives may be recovered as described above.

In addition to preparing the above acetals, or aldehydes, modified derivatives may be prepared which contain other substituent groups, hydroxyalkyl groups (e.g. hydroxypropyl ether groups), carboxyalkyl ether groups (e.g., carboxymethyl), ester groups (e.g., acetate groups), tertiary amino groups (e.g., dimethylaminoethyl ether groups), and quaternary amine groups (e.g., 3-(trimethylammonium chloride)-2-hydroxypropyl groups or 4-(trimethylammonium chloride)2-butenyl groups), introduced prior to or subsequent the graft polymerization. One of the advantages of grafting is that the reaction can be carried out at a neutral pH. Therefore, the more labile substituents present on the polysaccharide are not affected.

The acetal-containing monomers contain a reactive vinyl group and an acetal group or cyclic acetal. The known acrylamide and methacrylamide monomers are prepared according to the procedure reported by R. Epton and J. V. McLaren in Polymer Vol. 15, p. 565–1974). Acryloyl or methacryloyl chloride is added to a molar equivalent of N-(2,2-dimethoxyethyl, N-methyl amine in a dichloromethane-aqueous caustic (20%) mixture at low temperature ($-5°$ to $5°$ C.). The dichloromethane solution is separated from the aqueous layer, filtered, and stripped to isolate the product. The known methacrylate monomers may be prepared by reacting an alcohol-containing acetal compound with methacryloyl chloride in dichloromethane with triethylamine.

The novel acetal-containing monomers may be prepared in three or more ways. The first type of reactions are those between an alcohol- or amino-containing acetal and an acryl or methacryl compound having a reactive site such as an acryl halide (e.g., acryloyl chloride), an epoxide (e.g., glycidyl methacrylate), or an isocyanate (e.g., isocyanatoethyl methacrylate). The second type of reactions are those between an alcohol— or amino-containing vinyl monomer and an acetal having a reactive site such as a chlorohydrin or an epoxide group (e.g., 2-(glycidyloxyethoxy)-ethyl 1,3-dioxolane). The third type of reactions are those between two moles of an allyl halide and an amino-containing acetal or between diallylamine and an acetal with a reactive site such as those above. Styrene derivatives having a benzylic halide can also be used in preparing acetal-containing monomers. The acetal-containing monomers can be converted to aldehyde-containing monomers by treatment with acid at a pH of 6 or less.

Either the acetal-containing or aldehyde-containing monomers are useful as vinyl polymerizable monomers (i.e., monomers polymerizable by vinyl type polymerization procedures). They may be used to form homopolymers or their mixtures may be used to form polymers thereof. They may also be used to form addition polymers with other ethylenically unsaturated monomers. The polymers may be prepared by solution, emulsion, precipitation, suspension, or bulk polymerization techniques. The preferred method is emulsion polymerization.

Suitable comonomers include one or more monomers containing at least one ethylenically unsaturated group such as (methy)acrylonitrile; (meth)acrylic acid and the esters, amides and salts thereof; itaconic acid and its functional derivatives, preferably the esters; maleic anhydride, maleic and fumaric acids and the esters thereof; vinyl ethers and esters; styrene; ethylene; vinyl and vinylidene chlorides; and the like.

The aldehyde derivatives used as paper additives preferably contain cationic (e.g., such as the quaternary ammonium and tertiary amine group discussed above), amphoteric, and/or zwitterionic groups. These derivatives are dispersed in water before use. The granular starch derivatives are cooked to provide the dispersed derivative.

The starch may be cooked prior to graft polymerization to form the acetal, subsequent to graft polymerization, after conversion to the aldehyde, or during conversion of the acetal to the aldehyde. Cooking at pH 6 or less simultaneously converts the acetal to aldehyde and solublizes and disperses the starch aldehyde. Any conventional cooking procedure may be used, such as cooking a slurry containing the water-soluble or water-swellable derivative in a boiling water bath for about 20 minutes, blowing in steam to heat the slurry to about 93° C. (200° F.), or jet cooking. If a water-dispersible or water-soluble starch base is used for the preparation of the acetal, it will not be necessary to cook the acetal during the acid hydrolysis.

The aldehyde derivatives described herein may be used as beater additives, although their addition to the pulp may occur at any point in the paper-making process prior to the ultimate conversion of the wet pulp into a dry web or sheet. Thus, for example, they may be added to the pulp while the latter is in the hydropulper, beater, various stock chests, or headbox. The derivatives may also be sprayed onto the wet web. If the derivative is trapped in the wet fibers after spraying, it may not be necessary to use cationic aldehyde derivatives but they are preferred.

The aldehydes herein may be effectively used for addition to pulp prepared from any type of cellulosic fibers, synthetic fibers, or combinations thereof. Among the cellulosic materials which may be used are bleached and unbleached sulfate (kraft), bleached and unbleached sulfite, bleached and unbleached soda, neutral sulfite, semi-chemical chemiground wood, ground wood or any combination of these fibers. Fibers of the viscous rayon or regenerated cellulose type may also be used if desired.

Any desired inert mineral fillers may be added to the pulp which is to be modified with the aldehydes herein. Such materials include clay, titanium dioxide, talc, calcium carbonate, calcium sulfate and diatomacous earths. Rosin or synthetic internal size may also be present if desired.

The proportion of the aldehyde to be incorporated into the paper pulp may vary in accordance with the particular pulp involved and the properties desired (e.g., wet strength, temporary wet strength, or dry strength). In general, it is preferred to use about 0.1–10% preferably about 0.25–5% of the derivative, based on the dry weight of the pulp. Within this preferred range the precise amount which is used will depend upon the type of pulp being used, the specific operating conditions, the particular end use for which the paper is intended, and the particular property to be imparted. The use of amounts greater than 5%, based on the dry weight of the pulp is not precluded, but is ordinarily unnecessary in order to achieve the desired results.

It can be appreciated by the practitioner that a large number of variations may be effected in selecting the acetal derivatizing reagents, reacting them with the bases, converting them to the aldehydes, and utilizing the aldehyde derivatives as wet end additives for paper in accordance with the procedure described above without materially departing from the scope and spirit of the invention. Such variations will be evident to those skilled in the art and are to be included within the scope of the invention.

In the examples which follow, all parts and percentages are given by weight and all temperatures are in degrees Celsius unless otherwise noted. Reagent percentages are based on dry polysaccharide. The nitrogen content of the cationic bases and resulting acetals was measured by the Kjeldahl method and are based on dry polysaccharide. The presence of aldehyde groups are determined qualitatively by the viscosity increase of a cooked (i.e., dispersed) slurry and/or gel formation upon hydrolyzing the acetal to generate the aldehyde and quantitatively by titration. The quantitative test is carried out by slurrying 5.0 g of the polysaccharide acetal in sufficient distilled water to give 500 g. The pH is adjusted to 2.5 with hydrochloric acid. The polysaccharide is dispersed by cooking in a boiling water bath for 20 min. The dispersed polysaccharide is cooled and the solids determined. A 100 g. portion of the polysaccharide dispersion is weighed out, titrated with 0.1 NaOH to the first end point (inflection point is between pH 4 and 5) and the ml. of NaOH required is recorded ($T_1$). An aqueous solution (50 ml.) of hydroxylamine hydrochloride (prepared by dissolving 34.75 g. of the hydroxylamine hydrochloride in 1000 ml. volumetric flask and diluting to the mark with water) is added to a 100 g. portion of the polysaccharide dispersion, heated at reflux for 60 min., and titrated with 0.1N NaOH to pH 4.5. The ml. of NaOH required to reach the inflection point (pH 3.0–3.5) is recorded ($T_2$).

$$\% \text{ aldehyde} = \frac{(T_2 - T_1) \times (\text{normality of NaOH}) \times (2.9)}{\text{polysaccharide weight}^*}$$

-continued

*polysaccharide weight = 100 g. × % solids of dispersed polysaccharide

Best results are obtained using an automatic titrator. A blank of base polysaccharide (i.e., unmodified by the introduction of acetal groups) may also be run.

In the paper tests, the tensile strengths are reported as breaking length (m.). The breaking length is the calculated limiting length of a strip of uniform width, beyond which, if such as strip were suspended by one end, it would break of its own weight. The breaking length (air dry) in meters (m.) is calculated using the formula B.L.=102,000

$$\frac{T}{R} = 3{,}658 \frac{T'}{R'},$$

where T is tensile strength in Kn./m., T' is tensile strength in lb./in., R is grammage (air dry) in g./m.$^2$, and R' is weight per unit area (air dry in lb./1000 ft.$^2$). Paper specimens are selected in accordance with TAPPI T 400 sampling procedure.

EXAMPLE I

This example describes the preparation of various known acetal-containing monomers suitable for use in the graft polymerization.

N-(2,2-Dimethoxyethyl), N-methylacrylamide (I)

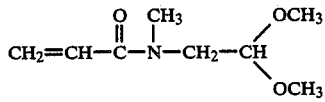

To 210 g. of a 20% aqueous sodium hydroxide solution in a 4-neck round bottom flask were added 122.84 g of and N-methylaminoacetaldehyde dimethyl acetal (MAADMA) and 350 ml dichloroethane were added. The temperature was reduced to about 0° to 5° C. and 92.4 g of acryloyl chloride was added quickly. The temperature was maintained at between −5° and +5° C. during the addition. The temperature was allowed to increase to room temperature and the mixture was stirred for 15 min. The dichloroethane layer was separated from the aqueous layer, filtered, and stripped to isolate the monomer. Purification of the product was done by vacuum distillation at 78.7° C. under 0.4 mm Hg. in the presence of 4-t-butyl catechol (0.1% by weight of monomer) to inhibit polymerization.

N-(2,2-Dimethoxyethyl)-N-methyl methacrylamide (II)

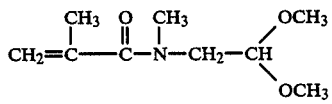

Using the above procedure, a methacrylamide monomer was prepared from 23.23 g methacryloyl chloride, 24.53 g N-methylaminoacetaldehyde dimethyl acetal, 42 g NaOH (20% aqueous solution), and 90 ml methylene chloride.

3,3-Dimethoxy-2,2-dimethylpropyl methacrylate (II)

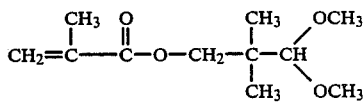

To a 500 ml four-neck round bottom flask equipped with a mechanical stirrer, condenser thermometer and addition funnel were added 21.24 g triethylamine, 29.8 g 3,3-dimethoxy-2,2 dimethylpropanol, and 180 ml methylene chloride. The temperature was reduced to about 0° C. to −5° C. A total of 24.6 g methacryloyl chloride was added dropwise through an addition funnel. While maintaining the temperature at about 0° to −5° C., the mixture was then allowed to warm to room temperature and stirred for 30 min, and added to an equal volume (180 ml) of ice-water. The methylene chloride layer was separated from the aqueous layer, a small amount of anhydrous magnesium sulfate (3 g) was added, the solution was filtered, and methylene chloride was stripped off to isolate the product. Purification was done by as above at 65.2° C. under 0.5 mm Hg pressure.

EXAMPLE II

This example describes the preparation of novel acetal-containing monomers suitable for use in the polysaccharide graft polymerization.

Part A

The chemical structure of the following monomers were verified by infrared, NMR, and GC-Mass spectral analyses.

2[2-(1,3-Dioxolan-2-yl)-ethoxy]ethyl methacrylate (IV)

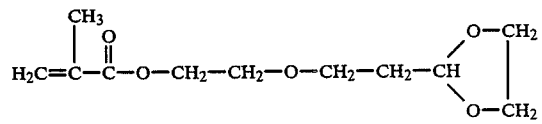

The preparation was similar to that used for the preparation of the monomer designated III except that 22.0 g triethylamine, 32.4 g 2-[2(2-hydroxyethoxy)-ethyl]-1,3-dioxolane and 180 ml methylene chloride were added initially and 23.22 g methacryloyl chloride were added dropwise. The monomer was purified by distillation at 106° C. under 0.2 mm Hg pressure.

2-[2-(1,3-Dioxolan-2-yl)-1-methylethoxy]ethyl methacrylate (V)

Following the above procedure, the monomer was prepared using 22 g triethylamine, 35.2 g 2-[2-(2-hydroxyethoxy)-propyl]-1,3-dioxolane, 23.22 g methacryloyl chloride, and 180 ml methylene chloride. The product was purified by vacuum distillation at 93.2° C. under 0.2 mm Hg pressure.

N-Methyl, N-(2,2-dimethoxy)ethyl, N,N-diallylammonium bromide (VI)

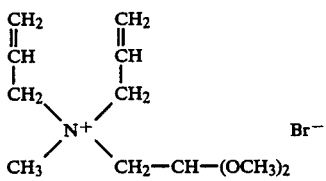

To a 250 ml four-neck round bottom flask, equipped as described in Example I, were added 23.83 g N-methylacetaldehyde dimethyl acetal and 25 ml tetrahydrofuran. Then 24.18 g allyl bromide were added slowly. While maintaining the temperature at about 0° C. After the addition was completed, the temperature was brought to 40° C. and the reaction mixture was stirred for 6 hours. It was then cooled to 0° C. and 50% aqueous sodium hydroxide solution (16 g) was added. Then, another equivalent amount of allyl bromide (24.18 g) was added slowly. The temperature was raised to 50° C. and the reaction mixture was stirred overnight. The reaction mixture was concentrated on a rotary evaporator. Acetone (400 ml) was added to the viscous liquid to precipitate the inorganic salt which removed by filtration. The acetone solution was concentrated on the rotary evaporator to give the final product. The moisture of this ammonium salt could not be determined accurately. The ionic bromide was 26.78% (expected 28.52%) and the organic bromide was 0%.

2-(5,5-Dimethyl-1,3-dioxan-2-yl)ethoxyethyl acrylate (VII)

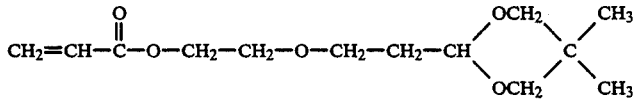

A mixture of hydroxyethyl acrylate (11.6 g), an equivalent amount of 2-ethylenyl-5,5-dimethyl-1,3-dioxane (EDD) (14.2 g), and a catalytic amount of p-toluenesulfonic acid (100 mg) was heated at 65° C. overnight. Gas chromatography showed that reaction occurred. The unreacted starting materials were removed at 40° C. under 0.05 mm Hg.

2-(5,5-Dimethyl-1,3-dioxan-2-yl)ethyl acrylate (VIII)

In the presence of a catalytic amount of p-toluenesulfonic acid (100 mg.) a mixture of acrylic acid (7.20 g, 0.1 mole) and 2-ethylenyl-5,5-dimethyl-1,3-dioxane (14.2 g) was stirred at 60° C. for 16 hours. Gas chromatography separation (the column temperature was raised from 50° C. to 200° C. at a rate of 15° C./minute) showed a major product at 8.40 minutes and some unreacted unsaturated acetal at 1.50 minutes. Both unreacted starting materials were easily stripped off under vacuum.

N-[2-(5,5-Dimethyl-1,3-dioxan-2-yl)ethyl]acrylamide (IX)

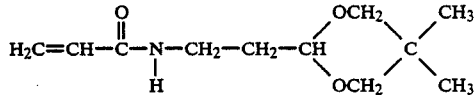

The product was prepared by reacting the unsaturated acetal (EDD) with acrylamide using a procedure similar to that described above.

[1-(5,5-Dimethyl-1,3-dioxan-2-yl]-2-propyl acrylate (X)

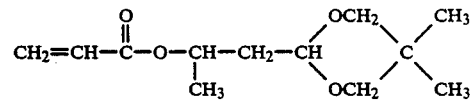

2-Propenyl-5,5-dimethyl-1,3-dioxane (PDD) was reacted with acrylic acid under the same conditions as the reaction with EDD (see Monomer VIII).

3-(N-Methyl, N-2,2-dimethoxyethyl)amino-2-hydroxypropyl methacrylate (XI)

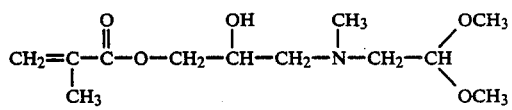

Glycidyl methacrylate (14.2 g) was reacted with 11.9 g. of MAADMA at 75° C. for 3 hours in the presence of a catalytic amount of tetrabutyl-ammonium chloride (150 mg) and an inhibitor (50 mg of 4-t-butyl catechol). Air was passed through the reaction mixture to prevent polymerization reactions. The product was isolated by vacuum distillation at 118° C. under 0.05 mm Hg pressure.

N,N-Dimethyl,N-[3-(2-dioxolan-2-yl)ethoxyethoxy-2-hydroxypropyl]methacrylamidopropylammonium chloride (XII)

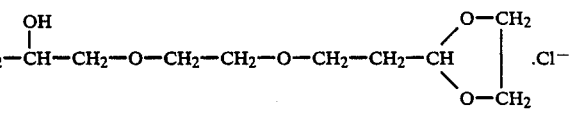

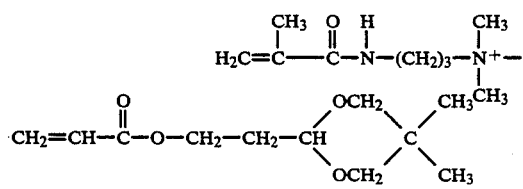

Dimethylaminopropyl methacrylamide (DMAPMA) was reacted with 2-(glycidyloxyethoxy)ethyl 1,3-dioxolane under acidic conditions to give the monomer. Thin-layer chromatography separation showed Rf 0.58, 0.35, and 0.18 for DMAPMA, 2-(glycidyloxyethoxy)ethyl 1,3-dioxolane, and the monomer, respectively (eluant: 50/50 toluene-methanol). The monomer can be purified by column chromatography.

[5-(Dimethoxymethyl)furfur-2-yl]methyl acrylate (XIII)

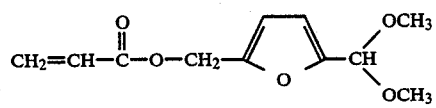

To a 500 ml four-neck round bottom flask equipped with a mechanical stirrer, condenser, thermometer, and addition funnel were added triethylamine (10.3 g), 2-hydroxymethyl furfural dimethyl acetal (17.2 g), and methylene chloride (90 ml). The temperature was brought down to to 0°-5° C., and acryloyl chloride (9.23 g) was added dropwise through an addition funnel while the temperature was maintained at between 0° C. and −5° C. After the addition was completed, the bath was warmed to room temperature and stirred for 30 min. The reaction mixture was added to an equal volume (90 ml) of ice-water. The methylene chloride layer was separated from the aqueous layer in a separatory funnel. A small amount of anhydrous magnesium sulfate was added to the methylene chloride solution. The methylene chloride was filtered and stripped to isolate the product which was purified by vacuum distillation at 95° C. under 0.5 mm Hg pressure.

5-(N,N-di-[propyl-1-en-3-]-aminomethyl)-2-furan carboxaldehyde (XIV)

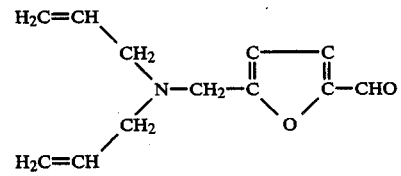

Using the procedure described above for the preparation of XIII, chloromethyl furfuraldehyde and diallylamine were reacted to provide the above monomer.

5-(N,N-di-[propyl-1-en-3-]aminomethyl)-2-dimethoxymethyl furan (XV)

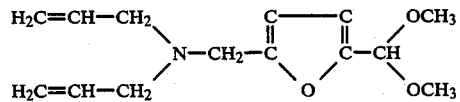

The above-acetal containing monomer was prepared by treating the monomer designated XIV with methanol in the presence of a trace amount of p-toluene sulfonic acid.

Part B

The following monomers can be prepared using the above procedures and indicated reagents:

5-(Propyl-1-en-3-oxymethyl)-2-furancarboxyaldehyde (XVI) from hydroxymethyl furfuraldehyde and allyl chloride

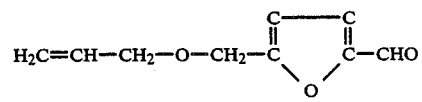

5-(N-Propyl-1-en-3-aminomethyl)-2-furancarboxyaldehyde (XVII) from chloromethyl furfuraldehyde and allyl amine

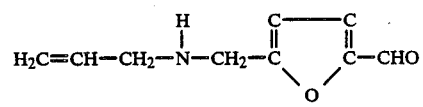

5-(Propyl-1-en-3-oxymethyl)-2-dimethoxymethyl furan (XVIII) by reaction of XVII with Methanol

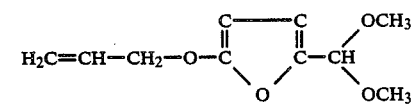

5-(N-Propyl-1-en-3 aminomethyl)-2-dimethoxymethyl furan (XIX) from chloromethyl furfuraldehyde and allyl amine, followed by treatment with methanol to convert the aldehyde to the acetal.

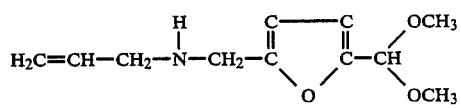

EXAMPLE III

The following methods were used to graft polymerize the acetal containing monomer onto starch.

Method A

The acetal-containing monomer (8.0 g) was dissolved in degassed water (16.0 g) in a 250 ml. four neck round bottom flask, equipped with mechanical stirrer, condenser, addition funnel, and nitrogen gas inlet. To this was added 40.0 g granular starch, 100 g Isopar M (a branched-chain isoparaffinic oil obtained from Exxon Corporation), 3.72 g Tween 85 and 0.94 g Span 80 (surfactants obtained from Imperial Chemical Industries). The temperature of the resulting suspension was raised to 65° to °C., and t-butyl peroxypivalate (0.2 ml. in 2 ml Isopar M) was added in three portions, one hour apart. The reaction was held for an additional three hours and then filtered washed with an ethanol-water mixture (50%), and dried.

Method B

A starch dispersion was prepared by cooking 30 g of an acid-hydrolyzed starch having a water fluidity (WF) of 85 in 60 g of degassed water for 20 minutes. It was added to a 250 ml four-neck round bottom flask, equipped with a mechanical stirrer, condenser, addition funnel, and nitrogen gas inlet. The acetal-containing monomer (6.0 g) was added with stirring and the temperature was raised to about 65°-70° C. An initiator solution of t-butyl hydrogen peroxide (0.1 g. of a 72% solution further diluted in 3.0 g degassed water) was added in three portions, one hour apart. The reaction mixture was held for an additional three hours. The resulting starch dispersion was acetone precipitated, filtered, washed, and dried.

The results are summarized in Table I. The results show that the starches modified by the introduction of an unsaturated substituent (i.e., 3-allyloxy 2-hydroxypropyl ether groups from reaction with allyl glycidyl ether) gave better grafting efficiency than the unmodi-

EXAMPLE V

This example demonstrates that the aldehyde-containing monomer designated XIII of Example II, Part A) can be used to form polymers other than graft polymers. Using standard emulsion polymerization techniques the monomer was polymerized with methyl methacrylate (MMA), ethyl acrylate (EA), and 2-hydroxyethyl acrylate (2-HEA).

TABLE I

| Starch (Base) | Polymerization | | | Polymer Analyses | | Properties | |
|---|---|---|---|---|---|---|---|
| | | Acetal Monomer | | Acetal | | | |
| | (Parts) | (Designation) | (Parts) | Procedure | N (%) | CHO (%) | Cook | Film |
| Corn | 40 | (I) | 8.0 | A | 0.12 | — | Stable, soft-set Adjust pH = 2.0 and became chunky | — |
| Corn treated with 0.5% AGE | 40 | (I) | 8.0 | A | 0.17 | — | Stable Adjust pH = 2.0 and became chunky | — |
| Waxy Corn (85 WF) | 30 | (III) | 6.0 | B | — | 0.79% | Thin, slightly cloudy | Insoluble Film (pH = 2.5) |
| Waxy Corn (85 WF) treated with 1% AGE | 30 | (III) | 6.0 | B | — | 1.61% | Thin, slightly cloudy | Insoluble Film (pH = 2.5) |
| Waxy Corn (85 WF) | 30 | (V) | 6.0 | B | — | 0.92% | Thin, slightly cloudy | Insoluble Film (pH = 2.5) |
| Waxy Corn (85 WF) treated with 1% AGE | 30 | (V) | 6.0 | B | — | 1.65% | Thin, slightly cloudy | Insoluble Film (pH = 2.5) |
| Waxy Corn (85 WF) treated with 1% AGE | 30 | (XIII) | 6.0 | B | — | 0.72% | Thin, slightly yellow | Soluble Film (pH = 2.5) |
| Corn | 40 | (VI) | 6.0* | A | 0.06% | | Unstable | |
| Corn treated with 0.5% AGE | 40 | (VI) | 6.0* | A | 0.34% | | Stable Adjust to pH = 2.0 and no gel formed | Insoluble Film (pH = 2.5) |
| Waxy Corn treated with 3.25% DEC | 40 | (I) | 8.0 | A | 0.05% | | Cohesive Stable | — |
| Waxy Corn treated with 3.25% DEC and 0.5% AGE | 40 | (I) | 8.0 | A | 0.32% | | Cohesive Adjust to pH = 2.0 and gel formed | — |

*4.0 parts of acrylic acid (adjusted to pH = 7.0 with 20% NaOH) was added in the graft polymerization and the hydroscopic acetal monomer was used as is.
AGE is allyl glycidyl ether
DEC is diethylaminoethyl chloride hydrochloride fied starch as indicated by the higher nitrogen % or aldehyde %.

EXAMPLE IV

The following method was used to graft polymerize an acetal-containing monomer onto a cellulose derivative.

A total of 4 g of N-(2,2-dimethoxyethyl), N-methyl acrylamide (see Example I for preparation of the monomer) was added to a 4-necked round bottom flask equipped with a mechanical stirrer, condenser, addition funnel, and nitrogen inlet and 8 g of degassed water were added. Hydroxyethyl cellulose (20 g), Isopar M (50 g), Tween 85 (1.86 g) and Span 80 (0.47 g) were added and stirred to form a suspension. The temperature was raised to 65°–70° C. The catalyst t-butyl peroxypivalate (0.2 ml in 2 ml. Isopar M) was added in three portions one hour apart. The reaction mixture was heated for an additional 3 hours, the heat was turned off, and mixture was stirred overnight. The product was washed three times with ethanol, then three times with acetone, and dried. The N content was 0.55% (expected 1.34%).

sodium persulfate was used as initiator. The resulting latex had a solids content of 47.1%, Brookfield viscosity of 60 cps., and pH of 3.1 The polymer of EA/MMA/2-HEA/CHO-monomer (80.5/4.5/5.5/9.5) was cast as a film. After air-drying the % insolubles were 81.8%; after drying for 5 min. at 130° C. the % insolubles were 83.8%.

EXAMPLE VI

Cationic starch graft polymers were prepared and evaluated as temporary wet strength additives in a paper furnish of 30:70 bleached softwood Kraft: bleached sulfite hardwood. The testing procedure previously described was used. The graft polymers were prepared by a cooking the indicated derivative in water for 20 minutes. The starch dispersion was added to a 250 ml four-neck round bottom flask, equipped with mechanical stirrer, condenser, additional funnel, and nitrogen gas inlet. The acetal monomer (designated No. I—see Example I), acrylamide, and optionally the cationic monomer dimethyldiallylammonium chloride (DMDAAC), Isopar M, and Tween 85 were added and stirred to form an emulsion. The reaction temperature was raised to 65°–70° C., and the initiator (t-butyl peroxypivalate, 0.2 ml in 2 ml Isopar M) was added in six portions at thirty minute intervals. The reaction was then held for an additional three hours. To quench the reaction, 5 drops of monomethyl ether hydroquinone solution (1% ethanol solution) was added.

The resulting emulsion was inverted to a 1% aqueous solution by the addition of water. The solution was then adjusted to pH 2.5 with hydrochloric acid and cooked using the preparation procedure and furnish of Example V. When the starch was a cationic starch derivative containing diethyl aminoethyl ether groups, the monomers used were the acetal (designated I—see Example I), acrylamide, and acrylic acid dissolved in the water and neutralized to pH 5.5 with 10% sodium hydroxide.

TABLE II

| | | Polymer | | | | | Paper | | | |
|---|---|---|---|---|---|---|---|---|---|---|
| Sample | Starch | Water | AM | DMDAAC | MAPTAC | Acetal Monomer I | Addition Level | Strength | (B.L.-m) Wet | |
| ple | (Base) | (parts) | (parts) | (parts) | (parts) | (parts) | (lb/ton) | Dry | (5 sec.) | (30 mins) |
| A | Waxy Corn (85 WF) treated with 1% AGE | 30 | 110 | 30 | 40 | | 8.0 | 10 | 6143 | 970 | 485 |
| B | Waxy Corn (85 WF) treated with 3.25% DEC and 0.5% AGE | 50 | 180 | 50 | — | | 8.0 | 10 | 6232 | 970 | 426 |
| C | Waxy Corn (85 WF) treated with 3.25% DEC and 0.5% AGE | 50 | 180 | 50 | — | | 5.0 | 10 | 5910 | 911 | 441 |
| D | Waxy Corn (85 WF) treated with 3.25% DEC and 0.5% AGE | 50 | 180 | 50 | — | | 3.0 | 10 | 6058 | 757 | 446 |
| E* | — | — | 180 | 100 | — | | 8.0 | 10 | 4410 | 262 | 134 |
| F* | — | — | 180 | 100 | — | | 5.0 | 10 | 4371 | 243 | 94 |
| G* | — | — | 200 | 90 | — | 10 | 5 | 10 | 5331 | 648 | 238 |
| H* | — | — | 200 | 90 | — | 10 | 10 | 10 | 5880 | 975 | 436 |

AGE is allyl glycidyl ether
DMDAAC is dimethyl diallylammonium chloride
AM is acrylamide
MAPTAC is methylacrylamidopropyl trimethyl ammonium chloride
*comparative synthetic polymers for 20 mins. at 95° C. on a steam bath to convert the acetal groups to aldehyde groups. The solution was added to the furnish in an amount sufficient to provide about 10 lb./ton.

The paper test results, as well as polymer compositions, are shown in Table II. The results show that it make no difference whether the cationic charge is introduced as a monomer (i.e., DMDAAC) or as a substituent on the starch (i.e., diethyl aminoethyl ether groups introduced by reaction with DEC). The dry strength and wet strength were comparable for the polymers designated A, B, and C. Polymer D prepared with only 3% of the acetal monomer showed lower wet strength after 5 secs. (757 vs. 911–970) but comparable wet strength after 30 mins. (446 vs. 426–485).

The results also show that the cationic starch graft polymers are significantly better in dry strength, wet strength, and temporary wet strength than neutral synthetic polymers containing an equivalent amount of the acetal monomers. The poor results shown by the neutral synthetic polymers were probably due to poor retention of the polymer on the paper.

The performance of the synthetic polymer was improved by the use of a cationic monomer, i.e., methylacrylamidopropyl trimethylammonium chloride (MAPTAC). However, at the lower level of acetal monomer (5 parts) the wet strength was significantly lower (648 vs. 911 after 5 secs. and 238 vs. 441 after 30 mins.). At the higher level of acetal monomer (10 parts) the dry strength was still less (5880 vs. 6232) but the wet strength was comparable (975 vs. 970 after 5 secs. and 436 vs. 426 after 30 mins.).

EXAMPLE VI

Amphoteric starch graft polymers were prepared and evaluated as temporary wet strength additives in paper using the preparation procedure and furnish of Example V. When the starch was a cationic starch derivative containing diethyl aminoethyl ether groups, the monomers used were the acetal (designated I—see Example I), acrylamide, and acrylic acid dissolved in the water and neutralized to pH 5.5 with 10% sodium hydroxide.

When the starch was an amphoteric starch derivative containing the above cationic group and phosphate as the anionic group (introduced by treatment with sodium trimetaphosphate), the monomers used were the acetal (designated I) and acrylamide.

The results in Table III show that amphoteric starch graft copolymers gave comparable wet and dry strength when the starch contained the unsaturated group introduced by reaction with allyl glycidyl ether (AGE). When the AGE was not present, the wet strength was lower (337 vs. 515–589 after 5 secs and 149 vs. 218–342 after 30 mins). It made no difference whether the anionic group was introduced by way of the monomer, i.e., the sodium acrylate, or was present on the starch as a phosphate substituent.

In comparison with the cationic starch graft polymers of Table II, the amphoteric graft polymers (both containing AGE) were only slightly lower in dry strength (5138–5999 vs. 5910–6232) but considerably lower in wet strength (515–589 vs. 757–970 after 5 secs and 149–342 vs. 426–485 after 30 mins).

EXAMPLE VII

This example describes a method for crosslinking the derivatives of Example III, where the monomer is an aromatic acetal, using various polyfunctional compounds such as polyethyleneimines, diethylene triamine, 2,5-hexanedione, and adipic dihydrazide The derivatives are dispersed by cooking for 20 minutes at a pH of 2.5 in a boiling water bath. By cooking at pH 2.5 the acetal is converted to the aldehyde. After the addition of 2–10%, preferably 1–5% (based on the starch) of one of the polyfunctional compounds, the starch cooks would be expected to change from a creamy consistency to a gel, indicating crosslinking had occurred.

TABLE III

| | | Polymer | | | | Addition | Paper | | | |
|---|---|---|---|---|---|---|---|---|---|---|
| | | | | | Acrylic | Acetal | Level | | (B.L.-m) Wet | |
| | Starch | | Water | Acrylamide | Acid | Monomer | (lb/ton) | Strength | | |
| Sample | Base | (parts) | (parts) | (parts) | (parts) | (parts) | pulp) | Dry | (5 Secs) | (30 Mins) |
| I | Waxy Corn (85 WF) treated with 3.25% DEC and 0.5% AGE | 50 | 167 | 50 | 1.67 in 16 ml. water | 8.0 | 10 | 5999 | 589 | 292 |
| J | Waxy Corn (85 WF) treated with 3.25% DEC and 0.5% AGE | 50 | 167 | 50 | 3.23 in 16 ml. water | 8.0 | 10 | 5787 | 515 | 342 |
| K | Waxy Corn (85 WF) treated with 3.25% DEC and 0.5% AGE; phosphorylated with 1.5% STP to 0.1% P | 50 | 167 | 50 | — | 8.0 | 10 | 5138 | 515 | 149 |
| L | Waxy Corn (85 WF) treated with 3.25 % DEC; phosphorylated with 1.5% STP to 0.1% P | 50 | 167 | 50 | — | 8.0 | 10 | 5588 | 337 | 218 |

AGE is allyl glycidyl ether
STP is sodium trimetaphosphate

Now that the preferred embodiments of the invention have been described in detail, various modifications and improvements thereon will become readily apparent to those skilled in the art. Accordingly, the spirit and scope of the present invention are to be limited only by the appended claims, and not by the foregoing specification.

What is claimed is:

1. A graft homopolymer wherein a repeating unit is derived from one or more ethylenically or allylically unsaturated monomers containing an acetal group

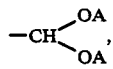

or graft copolymer wherein a repeating unit is derived from one or more ethylenically or allylically unsaturated monomers containing an acetal group

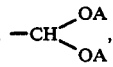

and from one or more ethylenically or allylically unsaturated monomers other than the acetal-containing monomer where A and A' are independently a lower alkyl or A and A' together form at least a 5-membered cyclic acetal.

2. A graft homopolymer wherein a repeating unit is derived from one or more ethylenically or allylically-unsaturated monomers containing an aldehyde group —CHO or graft copolymer wherein a repeating unit is derived from one or more ethylenically or allylically unsaturated monomers containing an aldehyde group —CHO and from one or more ethylenically or allylically unsaturated monomers other than the aldehyde-containing monomer, with the proviso that the graft homopolymer of copolymer contains no

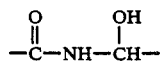

groups.

3. The graft polymer of claim 1 or 2, wherein the polysaccharide is selected from the group consisting of a starch, a gum, a cellulose, or a cellulose derivative.

4. The graft polymer of claim 3, wherein the polysaccharide is the starch.

5. The graft polymer of claim 4, wherein the starch is waxy maize, corn, high amylose corn, potato, rice, sweet potato, or tapioca starch.

6. The graft polymer of claim 5, wherein the starch is corn or waxy maize.

7. The graft polymer of claim 6, wherein the starch contains one or more cationic, anionic, nonionic, zwitterionic, or unsaturated groups.

8. The graft polymer of claim 7, wherein the starch contains cationic groups, cationic and anionic groups, unsaturated groups, or combinations of such groups.

9. The graft polymer of claim 8, wherein the cationic groups are diethyl-aminoethyl ether groups, the anionic groups are phosphate groups, and the unsaturated groups are 3-allyloxy 2-hydroxypropyl ether groups.

10. The graft polymer of claim 1 or 2, wherein M' is derived from N-(2,2-dimethoxyethyl)-N-methyl acrylamide; N-(2,2-dimethoxyethyl)-N-methyl methacrylamide; 3,3-dimethoxy-2,2-dimethylpropyl methacrylate; 2-[2-(1,3-dioxolan-2-yl)-ethyoxy]ethyl methacrylate; 2-[2-(1,3-dioxolan-2-yl)-1-methylethoxy]ethyl methacrylate; N-methyl, N-(2,2-dimethoxy)ethyl, N,N-diallylammonium bromide; 2-(5,5-dimethyl-1,3-dioxan-2-yl)ethoxyethyl acrylate; 2-(5,5-dimethyl-1,3-dioxan-2-yl)ethyl acrylate; N-[2-(5,5-dimethyl-1,3-dioxan-2-yl)ethyl]acrylamide; [1-(5,5-dimethyl-1,3-dioxan-2-yl]-2-propyl acrylate; 3-[N-methyl, N-(2,2-dimethoxy)ethyl-]amino-2-hydroxypropyl methacrylate; or N,N-dimethyl, N-[3-(2-dioxolan-2-yl)ethoxyethoxy-2-hydroxy]propyl methacrylamidopropylammonium chloride.

11. The graft polymer of claim 1 or 2, wherein M' or M" is derived from [5-(dimethoxymethyl)furfur-2-yl]methyl acrylate or methacrylate.

12. The graft polymer of claim 1 or 2, wherein M is derived from acrylamide, acrylic acid, dimethyldiallylammonium chloride, or from combinations thereof.

13. The graft polymer of claim 1 or 2, wherein M' or M" is derived from N-(2,2-dimethoxyethyl), N-methyl acrylamide; N-(2,2-dimethoxyethyl), N-methyl methacrylamide; 3,3-dimethoxy-2,2-dimethylpropyl methacrylate; 2-[2-(1,3-dioxolan-2-yl)-ethyoxy]ethyl methacrylate; 2-[2-(1,3-dioxolan-2-yl)-1-methylethoxy]ethyl methacrylate; N-methyl, N-(2,2-dimethoxy)ethyl, N,N-diallylammonium bromide; 2-(5,5-dimethyl-1,3-dioxan-2-yl)ethoxyethyl acrylate; 2-(5,5-dimethyl-1,3-dioxan-2-yl)ethyl acrylate; N-[2-(5,5-dimethyl-1,3-dioxan-2-yl)ethyl]acrylamide; [1-(5,5-dimethyl-1,3-dioxan-2-yl]-2-propyl acrylate; 3-[N-methyl, N-(2,2-dimethoxy)ethyl-]amino-2-hydroxypropyl methacrylate; or N,N-dimethyl, N-[3-(2-dioxolan-2-yl)ethoxyethoxy-2-hydroxy]propyl methacrylamidopropylammonium chloride and wherein M is derived from acrylamide, acrylic acid, dimethyldiallyl ammonium chloride, or from combinations thereof.

14. In a method for making paper having dry strength, wet strength, temporary wet strength, or combinations thereof, the step which comprises adding, as a strength aid, to the stock at any stage prior to forming a web, an effective amount of the polysaccharide graft polymer of claim 1 or claim 2 or mixtures thereof.

15. The paper containing the strength aid of claim 14.

* * * * *

UNITED STATES PATENT AND TRADEMARK OFFICE
CERTIFICATE OF CORRECTION

PATENT NO. : 4,866,151

DATED : September 12, 1989

INVENTOR(S) : John J. Tsai, Patrick G. Jobe and Robert L. Billmers

It is certified that error appears in the above-identified patent and that said Letters Patent is hereby corrected as shown below:

Column 19

Claim 1, line 1 insert -- polysaccharide -- after "A" and before "graft"

Claim 1, line 5 insert -- polysaccharide -- after "or" and before "graft copolymer"

Claim 2, line 1 insert -- polysaccharide -- after "A" and before "graft"

Claim 2, line 4 insert -- polysaccharide -- after "or" and before "graft"

Claim 2, line 9 insert -- polysaccharide -- after "the" and before "graft"

Col. 20, before line 25 insert the missing text --3. The graft polymer of Claim 1 or 2, wherein the polysaccharide is selected from the group consisting of --

Signed and Sealed this

Twenty-first Day of September, 1993

Attest:

BRUCE LEHMAN

Attesting Officer

Commissioner of Patents and Trademarks